United States Patent
Hanai et al.

(10) Patent No.: US 7,882,512 B2
(45) Date of Patent: Feb. 1, 2011

(54) AUTOMATIC BALANCING APPARATUS, ROTATING APPARATUS, DISC DRIVE APPARATUS, BALANCER, AND HOUSING

(75) Inventors: Rikuhiro Hanai, Tokyo (JP); Takashi Mochida, Chiba (JP); Yuji Shishido, Kanagawa (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 11/876,911

(22) Filed: Oct. 23, 2007

(65) Prior Publication Data

US 2008/0095022 A1 Apr. 24, 2008

(30) Foreign Application Priority Data

Oct. 24, 2006 (JP) ............................. 2006-288375

(51) Int. Cl.
*G11B 19/20* (2006.01)
(52) U.S. Cl. .................................................... 720/600
(58) Field of Classification Search ................. None
See application file for complete search history.

(56) References Cited

U.S. PATENT DOCUMENTS

| | | | |
|---|---|---|---|
| 6,492,750 B2 * | 12/2002 | Kikuchi et al. ................ 310/51 |
| 6,606,922 B2 * | 8/2003 | Case et al. ..................... 464/180 |
| 2001/0000312 A1 * | 4/2001 | Kume et al. ................... 369/263 |
| 2006/0109587 A1 * | 5/2006 | Shishido et al. ............. 360/99.08 |

FOREIGN PATENT DOCUMENTS

| JP | 04-312244 | 11/1992 |
|---|---|---|
| JP | 2007-172800 | 7/2007 |

OTHER PUBLICATIONS

A Japanese Office Action dated Oct. 7, 2008 issued in connection with counterpart Japanese Patent Application No. 2006-288375.

* cited by examiner

*Primary Examiner*—Mark Blouin
(74) *Attorney, Agent, or Firm*—SNR Denton US LLP (57) ABSTRACT

An automatic balancing apparatus is disclosed. The automatic balancing apparatus includes a housing, magnetic fluid, and a plurality of balancers. The housing is rotatable. The magnetic fluid is contained in the housing. Each of the plurality of balancers is movable in the housing and has a magnet and a yoke which is mounted thereto and which has a raised portion or a depressed portion formed on an inner circumferential side of a rotation of the housing.

9 Claims, 8 Drawing Sheets

AUTOMATIC BALANCING APPARATUS, ROTATING APPARATUS, DISC DRIVE APPARATUS, BALANCER, AND HOUSING

CROSS REFERENCES TO RELATED APPLICATIONS

The present invention contains subject matter related to Japanese Patent Application JP 2006-288375 filed in the Japanese Patent Office on Oct. 24, 2006, the entire contents of which being incorporated herein by reference.

BACKGROUND OF THE INVENTION

1. Field of the Invention

The present invention relates to an automatic balancing apparatus that balances the rotation of an object to be handled and to a rotating apparatus, a disc drive apparatus, a balancer, and a housing mounted in the automatic balancing apparatus.

2. Description of the Related Art

When a disc as a record medium is rotated on a turntable of a disc apparatus such as an optical disc apparatus or a magnetic disc apparatus that records and/or reproduces for example data, the rotation of the disc may be unbalanced. As a result, the stability of recording and/or reproducing may decrease.

A technique of improving the balance of the rotation of a disc has been proposed for example in Japanese Patent Application Laid-Open No. HEI 4-312244, paragraph (0006), FIG. 1. In this related art reference, a disc-shaped member having a space portion that contains magnetic fluid that operates as a balancer is disposed such that the member is rotated together with a motor shaft. The disc-shaped member has a boss portion. A ring magnet is mounted on a side circumferential surface of the boss portion. Thus, when the rotation rate of the rotation shaft is low, the ring magnet attracts magnetic fluid such that the disc-shaped member is not unbalanced.

SUMMARY OF THE INVENTION

Since a balancer made of fluid is lighter than a balancer made of a metal ball or the like of the related art, with the balancer made of fluid, the quietness is secured. However, it is difficult to balance the rotation of an object to be handled.

In view of the foregoing, it would be desirable to provide an automatic balancing apparatus that securely balances the rotation of an object to be handled and a rotating apparatus, a disc drive apparatus, a balancer, and a housing on which the automatic balancing apparatus is mounted.

In view of the foregoing, it would be also desirable to prevent a balancer from not smoothly moving due to frictional force and so forth that occur between an inner circumferential side of the balancer and a housing thereof.

According to an embodiment of the present invention, there is provided an automatic balancing apparatus. The automatic balancing apparatus includes a housing, magnetic fluid, and a plurality of balancers. The housing is rotatable. The magnetic fluid is contained in the housing. Each of the plurality of balancers is movable in the housing and has a magnet and a yoke which is mounted thereto and which has a raised portion or a depressed portion formed on an inner circumferential side of a rotation of the housing.

According to this embodiment of the present invention, since the balancer that includes the magnet and the yoke has a specific gravity as high as that of a metal ball of the related art, the balancer can securely balance the rotation of an object to be handled. In addition, since the magnetic fluid adheres to the balancer, the magnet smoothly moves. Thus, unlike the metal ball of the related art, in this embodiment, noise can decrease.

In addition, since the balancer includes the yoke, an optimum magnetic field is generated depending on the shape of the yoke. Thus, the balancer and the magnetic fluid that adheres to the balancer can be optimally moved.

In particular, in this embodiment, since the yoke has a raised portion or a depressed portion on its inner circumferential side, the raised portion or the depressed portion allows frictional force that occurs between the yoke and the housing to decrease and prevents the magnetic fluid from entering therebetween. Thus, the balancer can smoothly move.

The raised portion or the depressed portion is formed in a circumferential direction of the rotation of the housing such that the raised portion or the depressed portion is symmetrical with respect to a center of the balancer. Thus, since the posture of the balancer becomes stable, it can smoothly move in the housing. As a result, the automatic balancing apparatus can be prevented from unnecessarily vibrating and quickly balance the rotation of an object to be handled.

The raised portion or the depressed portion is composed of a plurality of members formed in a circumferential direction of the rotation of the housing such that the members are symmetrical with respect to a center of the balancer. Thus, the posture of the balancer becomes more stable than the balancer having one raised portion or one depressed portion.

The raised portion or the depressed portion is a member formed by a surface roughing treatment. The surface roughening treatment is typically a blast treatment that causes a surface to be roughened with a predetermined surface roughness.

According to an embodiment of the present invention, there is provided an automatic balancing apparatus. The automatic balancing apparatus includes magnetic fluid, a plurality of balancers, and a rotatable housing. Each of the plurality of balancers has a magnet and a yoke mounted thereon. The rotatable housing has an inner wall surface having a raised portion or a depressed portion and formed on an inner circumferential side of a rotation of the housing, an outer circumferential wall surface facing the inner circumferential wall surface, and a moving space formed between the inner circumferential wall surface and the outer circumferential wall surface. The plurality of balancers and the magnetic fluid are contained in the moving space.

According to an embodiment of the present invention, there is provided a rotating apparatus. The rotating apparatus includes a housing, a drive mechanism, magnetic fluid, and a plurality of balancers. The drive mechanism drives a rotation of the housing. The magnetic fluid is contained in the housing. Each of the plurality of balancers is movable in the housing and has a magnet and a yoke which is mounted thereto and which has a raised portion or a depressed portion formed on an inner circumferential side of a rotation of the housing.

According to an embodiment of the present invention, there is provided a disc drive apparatus. The disc drive apparatus includes a housing, a holding section, a drive mechanism, magnetic fluid, and a plurality of balancers. The holding section holds a disc-shaped record medium on which a signal is recordable. The drive mechanism integrally drives a rotation of the holding section and the housing. The magnetic fluid is contained in the housing. Each of the plurality of balancers is movable in the housing and has a magnet and a yoke which is mounted thereto and which has a raised portion or a depressed portion formed on an inner circumferential side of a rotation of the housing.

According to an embodiment of the present invention, there is provided a balancer which balances a rotation of an object to be handled. The balancer includes a magnet and a yoke. The yoke has a raised portion or a depressed portion formed on an inner circumferential side of the rotation and mounted on the magnet.

According to an embodiment of the present invention, there is provided a housing used for an automatic balancing apparatus which balances a rotation of an object to be handled and which contains a balancer and magnetic fluid, the balancer having a magnet. The housing includes a moving region and an inner circumferential wall surface. In the moving region, the balancer and the magnetic fluid are movable. The inner circumferential wall surface is formed on an inner circumferential side of the rotation in the moving region and has a raised portion or a depressed portion.

According to embodiments of the present invention, an object to be handled can be securely balanced. In addition, the balancer can be prevented from not smoothly moving due to frictional force and so forth that occur between the inner circumferential side of the balancer and the housing thereof.

These and other objects, features and advantages of the present invention will become more apparent in light of the following detailed description of best mode embodiments thereof, as illustrated in the accompanying drawings.

BRIEF DESCRIPTION OF DRAWINGS

The present invention will become more fully understood from the following detailed description, taken in conjunction with the accompanying drawings, wherein similar reference numerals denote similar elements, in which.

DESCRIPTION OF PREFERRED EMBODIMENTS

Next, with reference to the accompanying drawings, embodiments of the present invention will be described.

Figure 1:
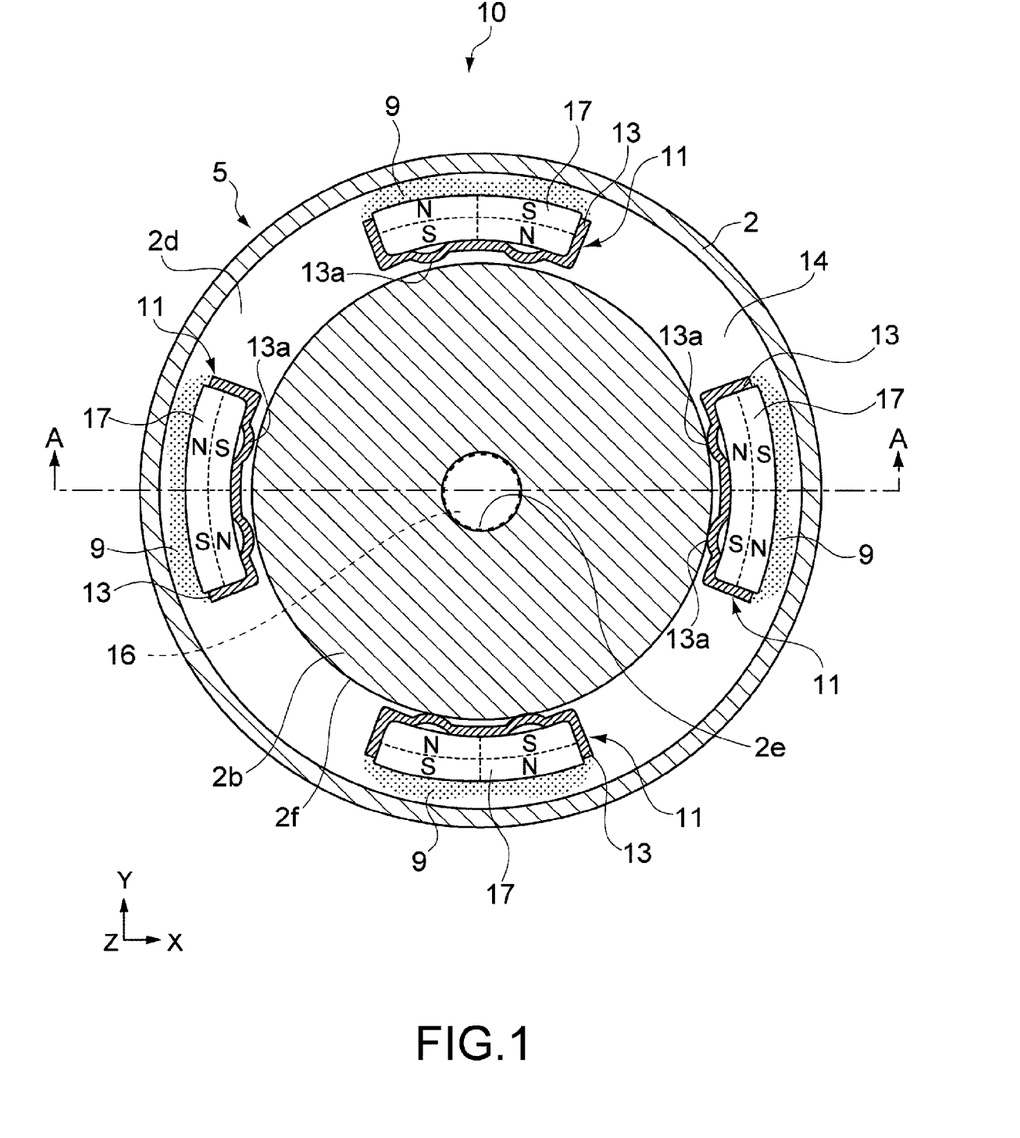
FIG. 1 is a sectional view showing an automatic balancing apparatus according to an embodiment of the present invention.
Figure 2:
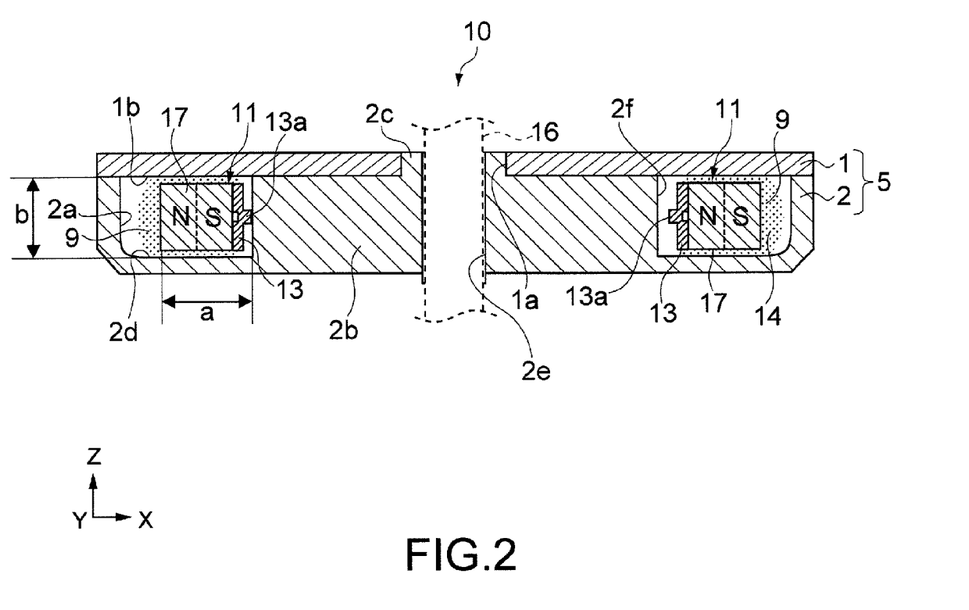
FIG. 2 is a sectional view taken along line A-A of the automatic balancing apparatus shown in FIG. 1.

FIG. 1 is a sectional view showing an automatic balancing apparatus according to an embodiment of the present invention. FIG. 2 is a sectional view taken along line A-A of the automatic balancing apparatus shown in FIG. 1. In FIG. 1 and FIG. 2, the automatic balancing apparatus is designated by reference numeral 10. The automatic balancing apparatus 10 includes a plurality of balancers 11 and a case 2 that contains the balancers 11. The case 2 has an upper opening on which the cover 1 is mounted. The case 2 and the cover 1 compose a housing 5. The housing 5 contains magnetic fluid 9. In this example, four balancers 11 are disposed. However, the number of balancers 11 is not limited to four. The number of balancers 11 may be any integer larger than two as long as they function.

Instead of the magnetic fluid 9, magneto-rheological (MR) fluid may be used. Examples of solvent of the magnetic fluid 9 include water, oil, and sodium polytungstate, but not limited thereto.

Formed at the center of the inside of the housing 5 is a boss portion 2b that protrudes upward. Formed between an outer circumferential wall surface 2a of the housing 5 and an inner circumferential wall surface 2f that is a side surface of the boss portion 2b is a moving space 14 in which the balancers 11 move. The upper and lower portions of the moving space 14 are limited by a lower path surface 2d and an upper path surface 1b (that is the rear surface of the cover 1).

As shown in FIG. 2, disposed on the upper surface of the boss portion 2b is a flange 2c. The flange 2c fits a hole 1a formed nearly at the center of the cover 1. The cover 1 and the case 2 are connected for example by welding, laser welding, crimping or pressure bonding, but not limited thereto. The cover 1 and the case 2 are made of a material that is not affected by magnetism of the balancers 11. Examples of the material of the cover 1 and the case 2 include plastics such as polycarbonate, aluminum alloys, bronze alloys, stainless steel, and ceramics, but not limited thereto.

A rotational shaft member 16 is inserted into and secured to a through-hole 2e formed in the boss portion 2b. As will be described later, the rotational shaft member 16 is a rotational shaft member of a motor disposed in a device on which the automatic balancing apparatus 10 is mounted or a separate coaxial shaft member.

As shown in FIG. 2, width a in the radial direction of the balancer 11 and width (height) b in the axial direction of the moving space 14 satisfy the relationship of a>b. In this structure, the balancers 11 that move in the moving space 14 can be prevented from turning over and their magnetizing direction from being reversed.

Figure 3A:
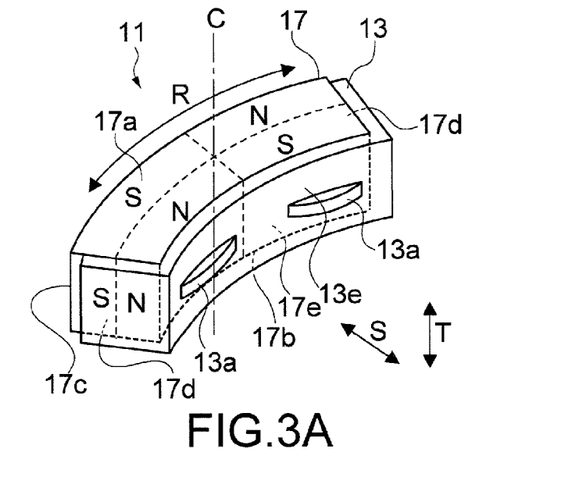
FIG. 3A, FIG. 3B, and FIG. 3C are schematic diagrams showing a balancer.
Figure 3B:
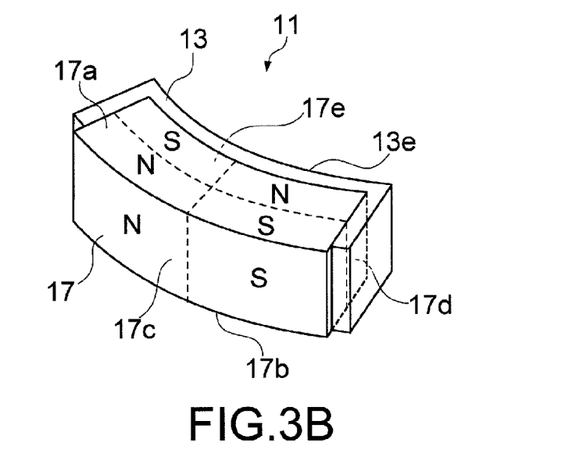
Figure 3C:
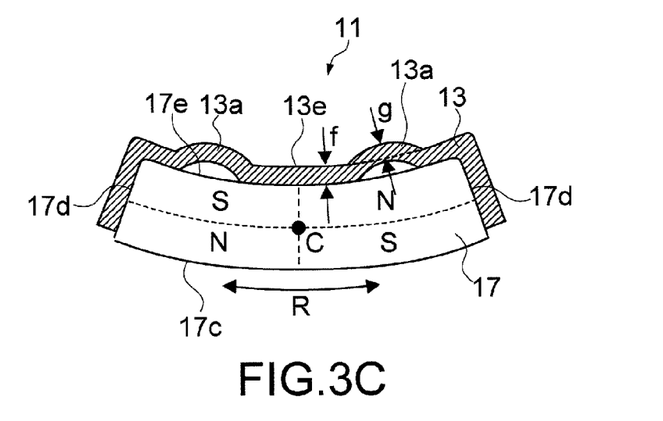

FIG. 3A is a schematic diagram of the balancer 11 viewed from the inner circumferential side of the automatic balancing apparatus 10. FIG. 3B is a schematic diagram of the balancer 11 viewed from the outer circumferential side of the automatic balancing apparatus 10. FIG. 3C is a plan view showing the balancer 11. The balancer 11 includes a magnet 17 and a yoke 13 that is connected thereto.

The magnet 17 has an arc block shape as a part of a ring. Examples of the material of the magnet 17 include ferrite and neodymium, but not limited thereto. The magnet 17 is magnetized for example in the circumferential direction of the rotation (designated by R direction) and the radial direction (designated by S direction). The magnets 17 of the plurality of balancers 11 disposed in the housing 5 are magnetized such that the magnets 17 of adjacent balancers 11 repel each other. In other words, the balancers 11 are disposed in the housing 5 such that the same magnetic poles face each other. As a result, the balancers 11 can be prevented from attracting each other in the housing 5.

However, the magnets 17 may not be disposed such that the same magnetic poles face each other. This is because as will be described later, since the yoke 13 is connected to the magnet 17, although a magnetic field occurs on the outer circumferential side, it becomes weak between the adjacent magnets 17.

The yoke 13 is connected to the magnet 17 such that the yoke 13 covers at least an inner circumferential surface 17e of the magnet 17. In this example, the yoke 13 covers the inner circumferential surface 17e and both side surfaces 17d. In other words, an upper surface 17a, a lower surface 17b, and an outer circumferential surface 17c of the magnet 17 are exposed. The magnet 17 and the yoke 13 are connected for example by welding, laser welding, ultrasound welding, crimping or pressure bonding, but not limited thereto. The yoke 13 allows the outer circumferential side of the balancer 11 to attract more magnetic fluid 9 than the inner circumferential side thereof. Thus, when the housing 5 is started to rotate and centrifugal force is applied to the magnetic fluid 9, a film of magnetic fluid 9 is formed on the outer circumferential side of the balancer 11. Thus, the balancers 11 quietly and smoothly move. In other words, before the automatic balancing apparatus 10 balances the rotation of an object to be handled, the balancers 11 are prevented from directly adhering to the outer circumferential wall surface 2a, resulting in not causing frictional force of the balancers 11 to increase and them to move. Since the upper surface 17a and the lower surface 17b also attract the magnetic fluid 9, when the automatic balancing apparatus 10 stops, the balancers 11 are suspended in the moving space 14 as shown in FIG. 2.

Formed on an inner circumferential side (inner circumferential surface) 13e of the yoke 13 is a raised portion 13a. As will be described later, the raised portion 13a allows frictional force that occurs between the yoke 13 and the housing 5 to decrease. As a result, the balancers 11 can smoothly move. The raised portion 13a may be formed for example by half-blanking the yoke 13. Instead, the yoke 13 and the raised portion 13a may be separate members that are connected. As shown in FIG. 3C, width g in the radial direction of the raised portion 13a may be nearly the same as or smaller than thickness f of the yoke 13, but not limited to this relationship.

As shown in FIG. 3A, a plurality of raised portions 13a are formed in circumferential direction R of the rotation of the housing 5 such that they are symmetrical with respect to the center of the balancer 11 (center line C in circumferential direction R). In the example shown in FIG. 3A and FIG. 3C, two raised portions 13a are formed. When a plurality of raised portions 13a are symmetrically formed, the balancer 11 can move in the housing 5 while keeping its posture stable. In particular, when the balancer 11 moves in the housing 5, the raised portions 13a prevent the balancer 11 from fluctuating in radial direction S and from unnecessarily vibrating. As a result, the automatic balancing apparatus 10 can quickly and securely balance the rotation of an object to be handled, for example, the disc D.

As shown in FIG. 3C, the front surface of the raised portion 13a is formed in an arc shape, but not limited thereto. Since the raised portion 13a is formed to decrease the contact area between the yoke 13 and the inner circumferential wall surface 2f of the housing 5 and thereby decrease the frictional force applied therebetween, the front surface of the raised portion 13a may be formed in any shape as long as the raised portion 13a allows the contact area and the frictional force to decrease.

In the example of the magnet 17 shown in FIG. 3A, FIG. 3B, and FIG. 3C, the number of magnetic poles is one pair in each of the circumferential direction and the radial direction of the balancer 11. Instead, the magnet 17 may have multiple pairs (namely, two or more pairs) of magnetic poles in each of the circumferential direction and the radial direction of the balancer 11. The larger the number of pairs of magnetic poles, the more uniformly the magnet 17 attracts the magnetic fluid 9. Thus, when the magnet 17 has multiple pairs of magnetic poles, the balancer 11 of the automatic balancing apparatus 10 can smoothly move. In addition, the magnet 17 may have one pair of magnetic poles or multiple pairs of magnetic poles in axial direction T of the rotation of the housing 5.

Figure 4:
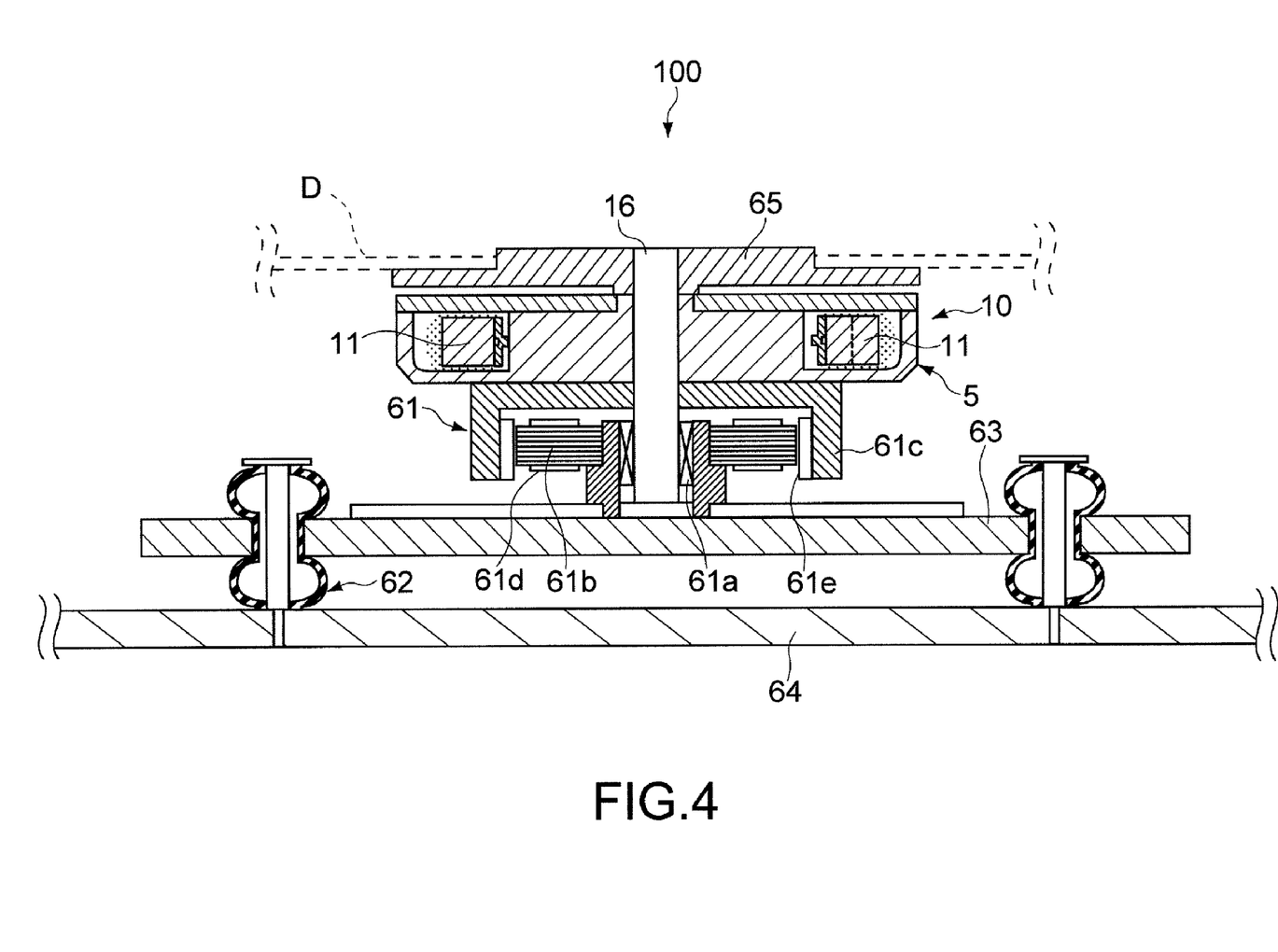
FIG. 4 is a sectional view showing a disc drive apparatus on which an automatic balancing apparatus is mounted.

FIG. 4 is a sectional view showing a disc drive apparatus on which the automatic balancing apparatus 10 is mounted.

In FIG. 4, the disc drive apparatus is designated by reference numeral 100. The disc drive apparatus 100 has a motor 61. Disposed at an upper end portion of a rotation shaft member 16 of the motor 61 is a turntable 65 on which a disc D is mounted. The motor 61 includes for example a stator 61b having a coil 61d in which a drive current flows, a rotor 61c having a magnet 61e and being rotatable through a bearing 61a, and the foregoing rotation shaft member 16. As described above, the automatic balancing apparatus 10 is mounted on the rotation shaft member 16 such that the automatic balancing apparatus 10 is rotatable together with the rotation shaft member 16. The motor 61 is supported by a sub chassis 63. The sub chassis 63 is supported by a main chassis 64 through an elastic member 62 made of a polymer material such as rubber, a metal member, and so forth. The sub chassis 63, the elastic member 62, and the main chassis 64 compose a vibration system. In this example, the vibration system is composed of all vibrations of members based on and disposed above the main chassis 64. Typically, the resonance frequency of the vibration caused by the deformation of the elastic member 62 is smaller than the rotation frequency of the disc D.

Examples of the disc D include a CD (Compact Disc), a DVD (Digital Versatile Disc), a BD (Blu-ray Disc (registered trademark)), an optical disc to and from which a signal can be recorded and reproduced by an optical method such as hologram, magneto-optical discs such as an MO (Magneto Optical disc), an MD (Mini Disc), and magnetic disks such as a hard disk, but not limited thereto.

Figure 5A:
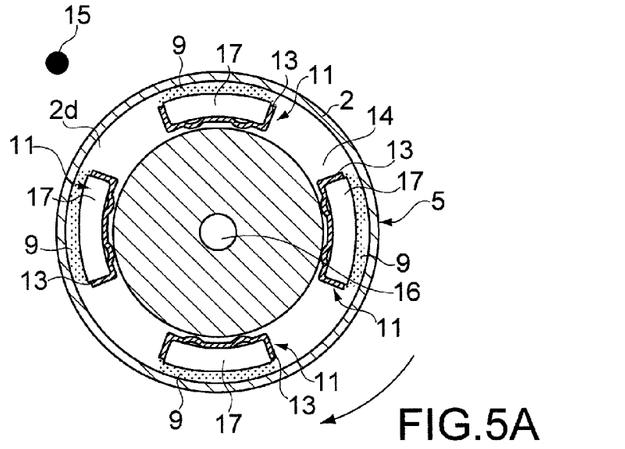
FIG. 5A, FIG. 5B, and FIG. 5C are schematic diagrams showing motions of the automatic balancing apparatus.
Figure 5B:
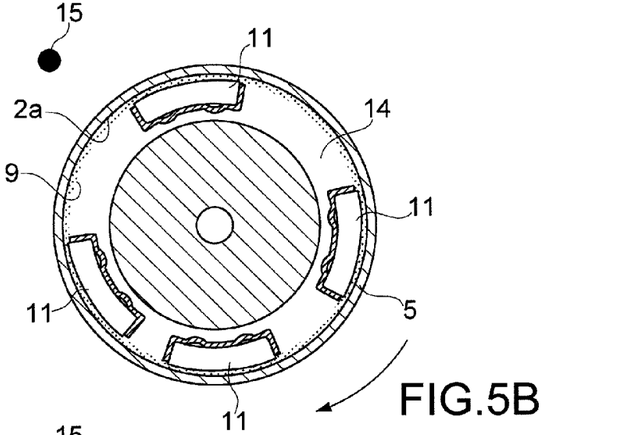
Figure 5C:
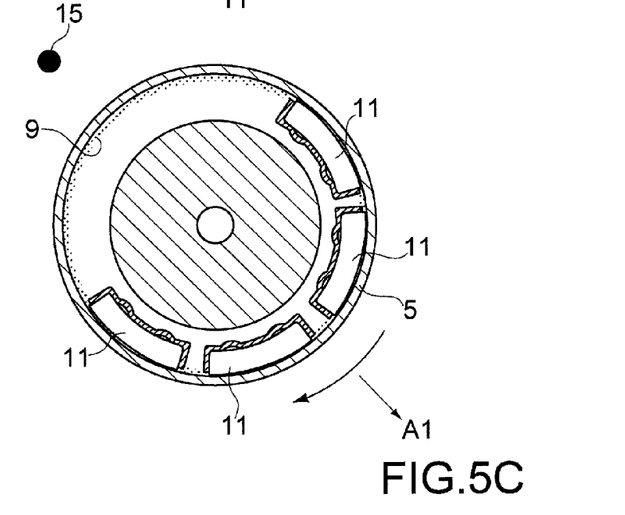

Next, the operation of the automatic balancing apparatus 10 will be described. FIG. 5A, FIG. 5B, and FIG. 5C show steps of the operation of the automatic balancing apparatus 10.

After the disc D is mounted on the turntable 65 and the motor 61 is started to rotate, the vibration system starts to vibrate. As shown in FIG. 5A, it is assumed that the disc D is eccentric due to the presence of an unbalance 15. The unbalance 15 may be present not only on the disc D, but on another member of the disc drive apparatus 100. When the motor 61 is initially rotated (in the low speed rotation state), the balancers 11 and the magnetic fluid 9 start to rotate together. This is because the sum of the force of viscosity of the magnetic fluid 9 and the frictional force of the balancers 11 against the upper path surface 1b or the lower path surface 2d through the magnetic fluid 9 is larger than the centrifugal force caused by the rotation of the housing 5.

When the rotation rate of the motor 61 increases, the balancers 11 start to slide in the moving space 14. Since the balancers 11 have the raised portions 13a on their inner circumferential side of the balancers 11 (the inner circumferential side 13e of the yokes 13), the frictional force between the balancers 11 and the inner circumferential wall surface 2f is small. In addition, the magnetic fluid 9 has a surface tension and the raised portions 13a cause the magnetic fluid 9 to enter the space formed between the balancers 11 and the inner circumferential wall surface 2f, resulting in preventing the balancers 11 from adhering to the inner circumferential wall surface 2f. Thus, as shown in FIG. 5B, the balancers 11 smoothly move in the moving space 14 and the centrifugal force causes the balancers 11 and the magnetic fluid 9 to move toward the outer circumferential side of the moving space 14.

When the rotation frequency of the motor 61 exceeds the resonance frequency of the vibration system, the phase of the unbalance 15 is nearly reversed from the phase of the vibration system. As a result, displacement direction A1 of the elastic member 62 nearly becomes the reverse of the position of the unbalance 15. At this point, as shown in FIG. 5C, the position of center of gravity of all the balancers 11 is caused to move in direction A1 and the magnetic fluid 9 is also caused to move in direction A1 along the outer circumferential wall surface 2a of the moving space 14. When the balancers 11 nearly stop against the rotation of the housing 5, namely the balancers 11 and the housing 5 integrally rotate, the unbalance 15 is cancelled and the rotation of the disc D is balanced. At this point, the rotation rate of the disc D is the rotation rate at which a signal is recorded or reproduced, for example in the range from 3000 to 7000 rpm, but not limited thereto.

When the rotation rate of the motor 61 decreases and it stops, the balancers 11 stop as they are (at the positions shown in FIG. 5B). Instead, depending on the posture of the automatic balancing apparatus 10, the balancers 11 move to any positions due to the influence of the gravity.

As described above, in the automatic balancing apparatus 10 of this embodiment, the balancers 11 including the magnet 17 and the yoke 13 have a specific gravity as high as that of metal balls of the related art. Thus, the automatic balancing apparatus 10 can securely balance the rotation of an object to be handled, for example, the disc D. When the magnet 17 has a high specific gravity, even if the housing 5 has a small diameter, the magnet 17 can cancel an unbalance. As a result, the automatic balancing apparatus 10 can be miniaturized. In addition, since the magnetic fluid 9 adheres to the balancers 11, they smoothly move. Thus, unlike metal balls of the related art, in the automatic balancing apparatus 10, noise can decrease.

In addition, since the balancer 11 includes the yoke 13, the balancer 11 optimally generates a magnetic field depending on the shape of the yoke 13. As a result, the balancers 11 and the magnetic fluid 9 that adheres thereto can optimally move.

In particular, when a device on which the automatic balancing apparatus 10 is mounted has an audio recording function, it is very advantageous to decrease the noise of the automatic balancing apparatus 10. When metal balls move as balancers as in the related art, it is concerned that the noise of the metal balls is recorded. Examples of the device having the audio recording function include a voice recorder and a portable sound/picture recording device, but not limited thereto.

Figure 6:
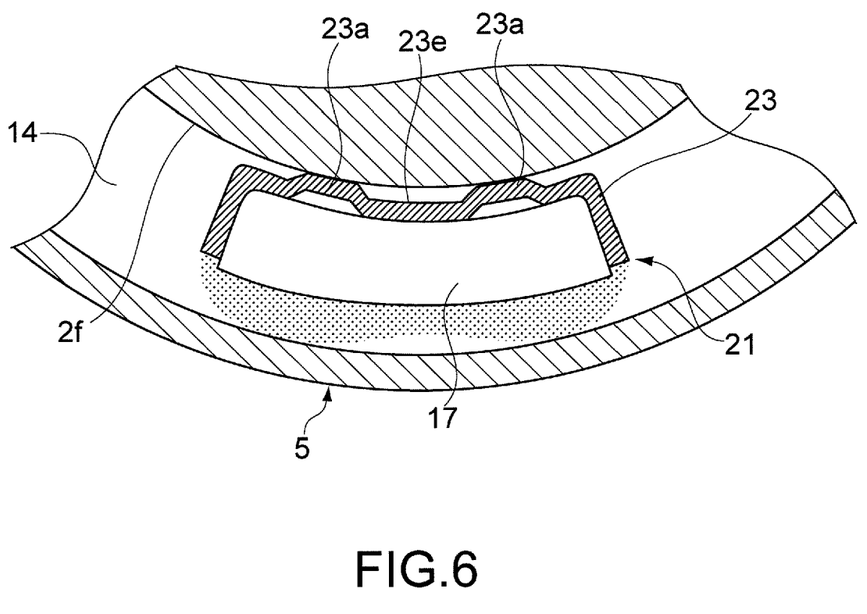
FIG. 6 is a sectional view showing a yoke used for a balancer according to another embodiment of the present invention.

FIG. 6 is a sectional view showing a balancer according to another embodiment of the present invention. In FIG. 6, the balancer is designated by reference numeral 21. The balancer 21 includes a yoke 23. The yoke 23 has a raised portion 23a on its inner circumferential surface 23e. The front surface of the raised portion 23a is formed in an arc shape or a nearly plane shape corresponding to the inner circumferential wall surface 2f of the housing 5. Thus, the contact area of the raised portion 23a to the inner circumferential wall surface 2f of the yoke 23 of this embodiment is larger than that of the yoke 13 shown in FIG. 3A, FIG. 3B, and FIG. 3C. However, there is a possibility of which the balancer 21 more smoothly moves than that of the balancer 11 shown in FIG. 3A, FIG. 3B, and FIG. 3C.

FIG. 7A, FIG. 7B, FIG. 7C, and FIG. 7D are perspective views showing yokes used for balancers according to other embodiments of the present invention.

Figure 7A:
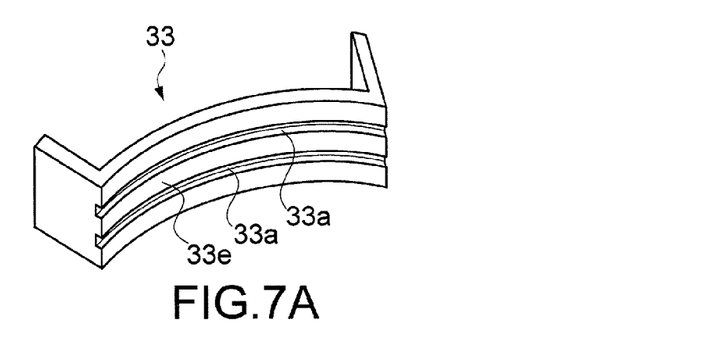
FIG. 7A, FIG. 7B, FIG. 7C, and FIG. 7D are perspective views showing yokes according to other embodiments of the present invention.

Formed on an inner circumferential surface 33e of a yoke 33 shown in FIG. 7A are a plurality of grooves (depressed portions) 33a in the circumferential direction of the rotation of a housing. In the example shown in FIG. 7A, the number of grooves 33a is two, but not limited thereto.

Figure 7B:
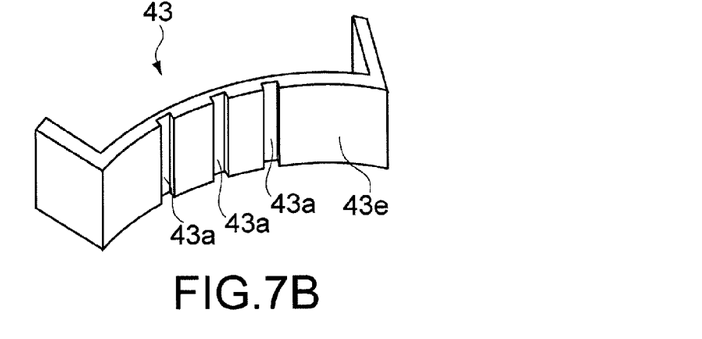

Formed on an inner circumferential surface 43e of a yoke 43 shown in FIG. 7B are a plurality of grooves (depressed portions) 43a in the axial direction of the rotation of a housing. In the example shown in FIG. 7B, the number of grooves 43a is three, but not limited thereto.

Figure 7C:
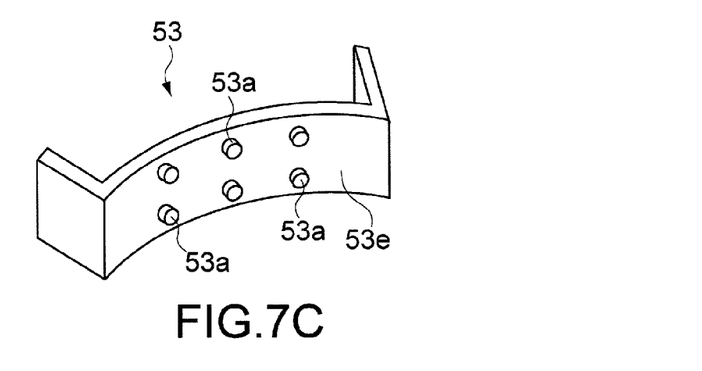

Formed on an inner circumferential surface 53e of a yoke 53 shown in FIG. 7C are a plurality of raised portions 53a smaller than the raised portions 13a shown in FIG. 3A, for example boss-shaped raised portions 53a. The plurality of raised portions 53a are disposed in the circumferential direction of the rotation of a housing such that the raised portions 53a are symmetrical with respect to the center of the balancer. The number of raised portions 53a is not limited.

Figure 7D:
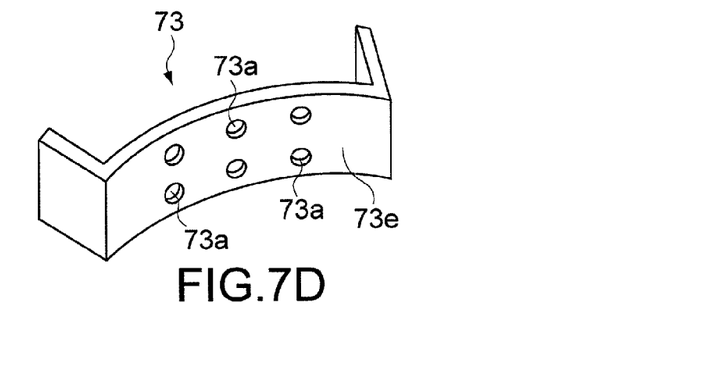

Formed on an inner circumferential surface 73e of a yoke 73 shown in FIG. 7D are a plurality of hole-shaped depressed portions 73a.

Figure 8:
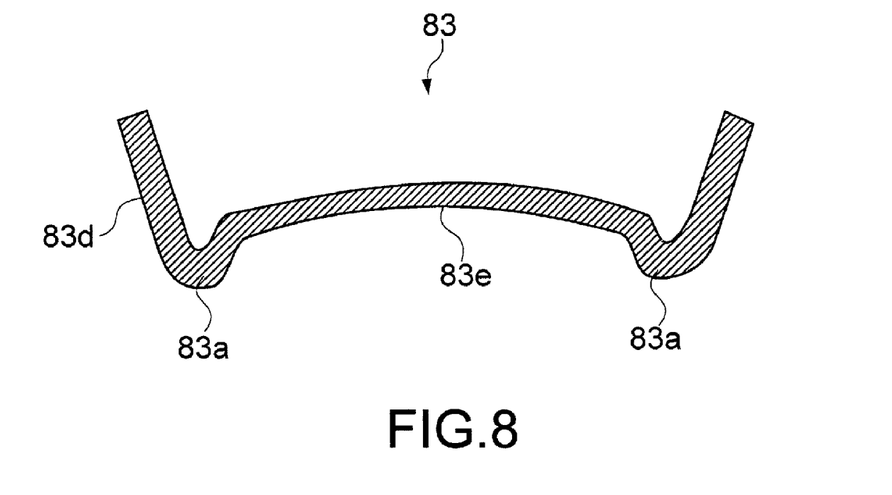
FIG. 8 is a sectional view showing a yoke according to another embodiment of the present invention.

FIG. 8 is a sectional view showing a yoke according to another embodiment of the present invention. In FIG. 8, the yoke is designated by reference numeral 83. The yoke 83 is formed by folding an inner circumferential surface 83e and a side surface 83d such that raised portions 83a protrude as folded portions. In other words, when the yoke 83 is produced, the smaller the size of the yoke 83, the more sharply the raised portions 83a may be formed as shown in FIG. 8. The folded portions as the raised portions 83a may be used to decrease the contact area of the yoke 83 and the inner circumferential wall surface 2f of the housing 5.

Figure 9:
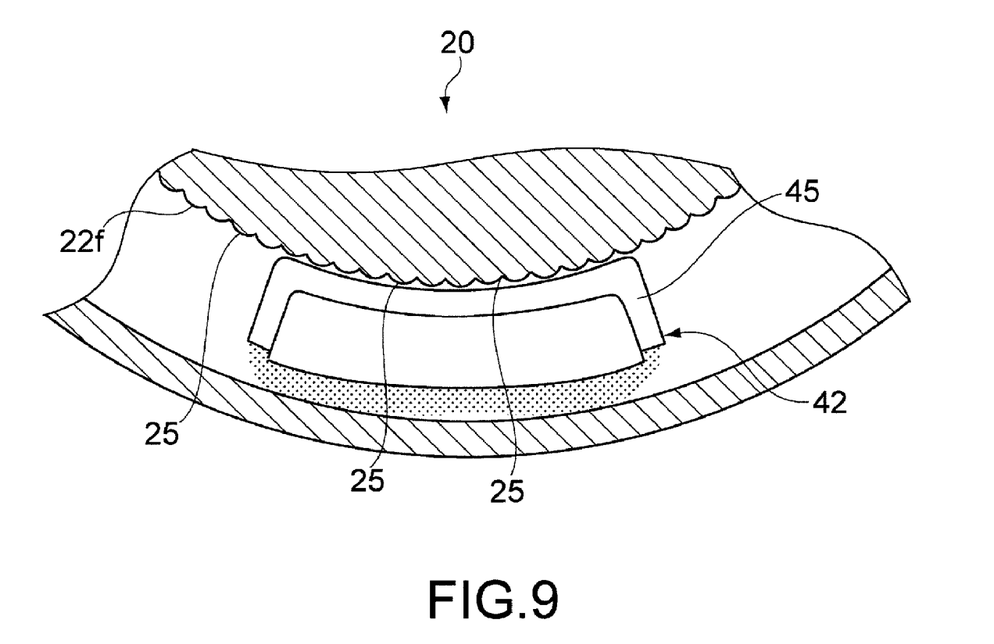
FIG. 9 is a sectional diagram showing a part of an automatic balancing apparatus according to another embodiment of the present invention.

FIG. 9 is a sectional view showing a part of an automatic balancing apparatus according to another embodiment of the present invention. In FIG. 9, the automatic balancing apparatus is designated by reference numeral 20. The automatic balancing apparatus 20 is different from the automatic balancing apparatus 10 in that an uneven portion 25 is formed on the inner circumferential surface 22f of the automatic balancing apparatus 20. In this structure, since the contact area of a balancer 42 and the inner circumferential surface 22f decreases without necessity of depressed or raised portions formed on a yoke 45 of the balancer 42, the frictional force of the balancer 42 and the inner circumferential surface 22f decreases.

The present invention is not limited to the foregoing embodiments. Instead, various embodiments may be made.

For example, the inner circumferential surface of a yoke may be unevenly formed by a surface roughing treatment. The surface roughing treatment is typically a blast treatment by which a surface is treated with a predetermined surface roughness. Instead of the blast treatment, depressed portions and raised portions may be alternately and regularly formed.

The raised portions 13a on the balancer 11 shown in FIG. 3A and FIG. 3C are formed on the inner circumferential side 13e in circumferential direction R of the rotation of the housing 5 such that the longer side of the raised portions 13a corresponds to circumferential direction R. Instead, the raised portions 13a shown in FIG. 3A and FIG. 3C may be formed on the inner circumferential side 13e in axial direction T of the rotation of the housing 5 such that the longer side of the raised portions 13a corresponds to axial direction T. Instead, the raised portion 13a shown in FIG. 3A and FIG. 3C may be formed from one end to the other end on the inner circumferential side 13e in circumferential direction R of the rotation of the housing 5 such that the longer side of the raised portion 13a corresponds to circumferential direction R. A yoke that is a combination of at least two of the raised portions 13a, 23a, and 53a and the depressed portions 33a, 43a, and 73a shown in FIG. 6 to FIG. 8 may be contemplated.

Formed on the inner circumferential surface 22f shown in FIG. 9 may be a groove-shaped uneven portion or another raised or depressed portion other than the uneven portion.

It should be understood by those skilled in the art that various modifications, combinations, sub-combinations and alternations may occur depending on design requirements and other factors insofar as they are within the scope of the appended claims or the equivalents thereof.

What is claimed is:

1. An automatic balancing apparatus, comprising:
   a rotatable housing;
   magnetic fluid contained in the housing; and
   a plurality of balancers each of which is movable in the housing and has a magnet and a yoke mounted to the magnet, wherein the yoke has a raised portion or a depressed portion formed on an inner circumferential side of the yoke to at least allow friction between the yoke and the housing to decrease.

2. The automatic balancing apparatus as set forth in claim 1,
   wherein the raised portion or the depressed portion is formed in a circumferential direction of the rotation of the housing such that the raised portion or the depressed portion is symmetrical with respect to a center of the balancer.

3. The automatic balancing apparatus as set forth in claim 1,
   wherein the raised portion or the depressed portion is composed of a plurality of members formed in a circumferential direction of the rotation of the housing such that the members are symmetrical with respect to a center of the balancer.

4. The automatic balancing apparatus as set forth in claim 1,
   wherein the raised portion or the depressed portion is a member formed by a surface roughing treatment.

5. An automatic balancing apparatus, comprising:
   magnetic fluid;
   a plurality of balancers each of which has a magnet and a yoke mounted to the magnet; and
   a rotatable housing which has an inner wall surface having a raised portion or a depressed portion and formed on an inner circumferential side of a rotation of the housing, an outer circumferential wall surface facing the inner circumferential wall surface, and a moving space formed between the inner circumferential wall surface and the outer circumferential wall surface, the plurality of balancers and the magnetic fluid being contained in the moving space, wherein the inner circumferential wall surface of the housing has the raised portion or the depressed portion to at least allow friction between the yoke and the inner circumferential wall surface of the housing to decrease.

6. A rotating apparatus, comprising:
   a rotatable housing;
   a drive mechanism which drives a rotation of the housing;
   magnetic fluid contained in the housing; and
   a plurality of balancers each of which is movable in the housing and has a magnet and a yoke mounted, wherein the yoke has a raised portion or a depressed portion formed on an inner circumferential side of the yoke to at least allow friction between the yoke and the housing to decrease.

7. A disc drive apparatus, comprising:
   a rotatable housing;
   a holding section which holds a disc-shaped record medium on which a signal is recordable;
   a drive mechanism which integrally drives a rotation of the holding section and the housing;
   magnetic fluid contained in the housing; and
   a plurality of balancers each of which is movable in the housing and has a magnet and a yoke mounted, wherein the yoke has a raised portion or a depressed portion formed on an inner circumferential side of the yoke to at least allow friction between the yoke and the housing to decrease.

8. A balancer which balances a rotation of an object to be handled, the balancer disposed in a rotatable housing, the balancer comprising:
   a magnet; and
   a yoke mounted to the magnet, the yoke having a raised portion or a depressed portion formed on an inner circumferential side of the yoke to at least allow friction between the yoke and the housing to decrease.

9. A housing used for an automatic balancing apparatus which balances a rotation of an object to be handled and which contains a balancer and magnetic fluid, the balancer having a magnet and a yoke, comprising:
   a moving region in which the balancer and the magnetic fluid are movable; and
   an inner circumferential wall surface formed on an inner circumferential side of the rotation in the moving region, wherein the inner circumferential wall surface of the housing has a raised portion or a depressed portion to at least allow friction between the yoke and the inner circumferential wall surface of the housing to decrease.

* * * * *